(12) United States Patent
Vollmar et al.

(10) Patent No.: US 7,206,968 B2
(45) Date of Patent: Apr. 17, 2007

(54) SYSTEM AND METHOD FOR GENERATING AN XML-BASED FAULT MODEL

(75) Inventors: Gerhard Vollmar, Meckenheim (DE); Zaijun Hu, Ludwigshafen (DE); Jari Kallela, Espoo (FI); Manuel Greulich, Oberwolfach (DE)

(73) Assignee: ABB Research Ltd, Zürich (CH)

( * ) Notice: Subject to any disclaimer, the term of this patent is extended or adjusted under 35 U.S.C. 154(b) by 533 days.

(21) Appl. No.: 10/349,395

(22) Filed: Jan. 22, 2003

(65) Prior Publication Data

US 2004/0143778 A1 Jul. 22, 2004

Related U.S. Application Data

(63) Continuation of application No. PCT/EP00/07059, filed on Jul. 22, 2000.

(51) Int. Cl.
*G06F 11/00* (2006.01)
(52) U.S. Cl. ...................................................... 714/26
(58) Field of Classification Search .................. 714/26
See application file for complete search history.

(56) References Cited

U.S. PATENT DOCUMENTS

| | | | | |
|---|---|---|---|---|
| 5,305,426 A | * | 4/1994 | Ushioda et al. ............... 706/52 |
| 5,596,712 A | * | 1/1997 | Tsuyama et al. ............... 714/26 |
| 5,625,574 A | * | 4/1997 | Griffiths et al. ............. 702/183 |
| 5,799,294 A | * | 8/1998 | Tanaka ........................ 706/46 |
| 5,905,989 A | * | 5/1999 | Biggs ...................... 707/104.1 |
| 5,914,875 A | * | 6/1999 | Monta et al. .................. 700/79 |
| 5,922,079 A | * | 7/1999 | Booth et al. ................... 714/26 |
| 6,519,617 B1 | * | 2/2003 | Wanderski et al. .......... 715/513 |
| 6,535,896 B2 | * | 3/2003 | Britton et al. ............... 715/523 |
| 6,569,207 B1 | * | 5/2003 | Sundaresan .................. 715/513 |
| 6,585,778 B1 | * | 7/2003 | Hind et al. .................. 715/513 |
| 6,601,071 B1 | * | 7/2003 | Bowker et al. .............. 707/102 |

(Continued)

OTHER PUBLICATIONS

Database and Expert Systems Applications, 2001. Proceedings. 12th International Workshop on. Publication Date: Sep. 3-7, 2001 pp. 71-75.*

(Continued)

*Primary Examiner*—Robert Beausoliel
*Assistant Examiner*—Elmira Mehrmanesh
(74) *Attorney, Agent, or Firm*—Laurence A. Greenberg; Werner H. Stemer; Ralph E. Locher (57) ABSTRACT

A method and system for generating an XML-based fault model for fault case analysis, i.e., fault events in industrial plants includes a data entry device connected to a word processor belonging to a data processor having access to a template memory and being connected to a first fault model memory, by which measures the data entry device is set up for data entry for compiling a fault model as a Word document and for storing the document in the model memory, a translator accessing the model memory and connected to a schematic memory storing XML types produced by transferring a template in the template memory into XML types, a second fault model memory storing XML instances produced by translating the document, and an XML engine accessing the schematic memory and the second memory and displaying an XML-based fault model stored therein through a display device and a web browser.

8 Claims, 7 Drawing Sheets

U.S. PATENT DOCUMENTS

| | | | |
|---|---|---|---|
| 6,604,100 B1 * | 8/2003 | Fernandez et al. | 707/3 |
| 6,687,873 B1 * | 2/2004 | Ballantyne et al. | 715/500 |
| 6,725,426 B1 * | 4/2004 | Pavlov | 715/523 |
| 6,792,562 B1 * | 9/2004 | Korhonen | 714/39 |
| 6,912,671 B2 * | 6/2005 | Christensen et al. | 714/25 |
| 6,915,456 B2 * | 7/2005 | Banerjee et al. | 714/39 |
| 6,934,696 B1 * | 8/2005 | Williams et al. | 706/47 |
| 6,985,889 B1 * | 1/2006 | Tapio et al. | 706/45 |
| 7,013,411 B2 * | 3/2006 | Kallela et al. | 714/47 |
| 2003/0014421 A1 * | 1/2003 | Jung | 707/102 |
| 2003/0097617 A1 * | 5/2003 | Goeller et al. | 714/39 |
| 2004/0205565 A1 * | 10/2004 | Gupta | 715/513 |

OTHER PUBLICATIONS

Author not listed: "i4i Delivers XML to Every Desktop with New Release of S4/TEXT(TM)", I4I Press Release Archive, The Collaborative Content Company, Nov. 1, 1999, pp. 1-10.

Author not listed: "Majix Light 1.1", TetraSix, Mar. 24, 1999, pp. 1-32.

Deckers, J. et al.: FMEA und Fehlerbaumanalyse im Verbund nutzen [FMEA and Fault Tree Analysis Used Interconnectedly], Carl Hanser Verlag, München, vol. 39, No. 1, Jan. 1994, pp. 47-50.

* cited by examiner

| Format | Fault event<br>Fault mode<br>Fault hypothesis<br>Name<br>Description<br>Fault effect<br>Fault location<br>*Verification check list*<br>Diagnostic criterion<br>Diagnostic method<br>Diagnostic effort<br>Aids<br>Prior conditions<br>Fault tree reference |
|---|---|

FIG. 4

Fault hypothesis – fault in the cleaning plant

Description: ...
Fault effect: ...
Fault location: cleaning plant

<u>Verification check list</u>

Indentations in the steel plate?
  Diagnostic method: ...
  Diagnostic effort: low

Black spots on the steel plate?
  Diagnostic method: ...
  Diagnostic effort: low

Imprint on the working roll?
  Diagnostic method: ...
  Diagnostic effort: medium

Fault tree reference
  Cleaning plant

FIG. 5

```
<ElementType name="rcaeltfaultevent" content="eltOnly" model="open">
    <attribute type="rcaattname" required="yes"/>
    <attribute type="rcaattdescription" required="yes"/>
    <attribute type="rcaattfaulteffect " required="no"/>
    <attribute type="rcaattfaultlocation" required="no"/>
    <attribute type="rcaattdiagnosticcriterion" required="no"/>
    <element type="rcaeltfaultmode" minOccurs="0" maxOccurs="*"/>
    <element type="rcaeltfaulthypothesis" minOccurs="0" maxOccurs="*"/>
```

FIG. 6

```
<rcai:rcaeltHotRollingFaultmodel>
 <rcai:rcaeltFaultevent
  rcaattName="Work roll change"
  rcaattDescription="The work rolls have to apply pressure onto the plate in a rolling motion in order to flatten it."
  rcaattFaulteffect="Sub-system Rolling Mill (4 High Stand) closed for work roll change. Normally causes ...."
  rcaattFaultlocation="Work rolls at rolling mill"
  rcaattDiagnosticcriterion="Maintenance records show lower MTBR or delta x lt; 15000 m"

<rcai:rcaeltFaultmode
  rcaattName="Work roll damaged"
  rcaattDescription="Work rolls show visible cracks or cracks which can be detected by using NDT devices. "
  rcaattFaulteffect="MTBR lowered by cracks or untrue shape. Product quality may be reduced"
  rcaattFaultlocation="Work rolls at rolling mill"
  rcaattDiagnosticcriterion="Visual inspection of rolls: check for untrue shape, check for cracks"

rcai:rcaeltFaulthypothesis
  rcaattName="Cooling system performance LTA"
  rcaattDescription="Work rolls have to be kept within specified temperature limits by spraying water in the ... "
  rcaattFaultlocation="Work roll cooling system (open circuit type) ">
  <rcai:rcaattDiagnosticcriterion="1. CHECK IF STEAM VISIBLE AND/OR AUDIBLE
  rcaattDiagnosticmethod="optical and acoustic inspection of work roll cooling system. "
  rcaattDiagnosticeffort="low" rcaattQualification="None">
 <rcai:rcaeltReference>
```

FIG. 7

SYSTEM AND METHOD FOR GENERATING AN XML-BASED FAULT MODEL

CROSS-REFERENCE TO RELATED APPLICATION:

This is a continuing application, under 35 U.S.C. §120, of copending International Application No. PCT/EP00/07059, filed Jul. 22, 2000, which designated the United States.

BACKGROUND OF THE INVENTION

Field of the Invention

The invention relates to a system and a method for generating an XML-based fault model for fault cause analysis.

Fault models are suitable for the analysis of fault causes in the case of fault events in industrial production plants, in particular, in the context of a service system for determining the effectiveness (overall equipment effectiveness ("OEE")) of production plants, of fault events, and the causes of the fault events contributing substantially to productivity losses.

The fault models are hierarchically structured cause/effect models, whose structures are also referred to as fault trees. Each node of a tree can be interpreted as a fault hypothesis of the node associated with it in the next higher level. A node contains all the information relating to verification of the fault hypothesis. Thus, for a specific fault event, which is usually described in the top node, all the causes can be determined by a step-by-step verification of the hypotheses in the intermediate levels.

Such fault models are usually drawn up by a familiar text processing system, in particular, by using Microsoft Word, and stored as a Word document. However, the possible utilization for fault cause analysis is restricted in the case of fault models that are present in such a form. The depiction of such Word documents in a web (World Wide Web) environment would, therefore, be desirable.

A web browser is able to visualize information that is deposited in a web server in the HyperText Markup Language (HTML) format. Able to be incorporated in an HTML page (web page) are text, tables, images, videos, programs, and Applets, as they are referred. In addition, HTML pages can be linked to one another by hyperlinks. This technology, therefore, possesses the potential of providing complex and comprehensive models for fault cause analysis and navigation in the fault trees in a comprehensive and user-friendly manner in an IT environment.

As opposed to HTML, which merely provides data formats for visualization by a web browser, complex data structures can be defined with Extensible Markup Language (XML). In XML, the contents of models for fault cause analysis can, therefore, be depicted. For example, in XML, a verification checklist for fault hypothesis can be defined as a data structure. Such definition has the advantage that an XML implementation permits far more complex interactions, for example, quite different views of the same model. These views can be visualized in a web browser by using Extensible Style Language (XSL), which is not possible in this way in HTML. In HTML, the information that is visualized is always just that information which is actually implemented. The visualization in HTML is, so to speak, "hard-wired."

The disadvantage of HTML, namely, the lack of any possibility of describing the contents of models for fault cause analysis, is removed by XML. The description of the contents of the XML implementation permits functionalities that would be feasible in HTML only with a great deal of effort. However, the direct compilation of a model for fault cause analysis in XML is quite complicated. In addition, at present, and even in the foreseeable future, few resources are available that master this technology at all.

SUMMARY OF THE INVENTION

It is accordingly an object of the invention to provide a system and method for generating an XML-based fault model that overcome the hereinafore-mentioned disadvantages of the heretofore-known devices and methods of this general type and with which, as a result of the required data being input, a fault model can be drawn up as a Word document, which is, then, depicted in automated fashion as an XML fault model.

With the foregoing and other objects in view, there is provided, in accordance with the invention, a system for generating an XML-based fault model for fault cause analysis, including a template memory for storing templates, a first fault model memory, a schematic memory for storing XML types, a second fault model memory for storing XML instances, a data processing device having a word processor and a translator, the data processing device connected to the template memory for accessing the template memory and connected to the first fault model memory a data entry device connected to the word processor, the data entry device passing data for compiling a fault model as a Word document at least through the data processing device, the word processor, and the first fault model memory, the Word document being stored in the first fault model memory, and the translator connected to the first fault model memory for accessing the first fault model memory, connected to the schematic memory, the translator programmed to produce the XML types in the schematic memory by transferring a template stored in the template memory into the XML types, and connected to the second fault model memory, the translator programmed to produce the XML instances by translating the Word document stored in the first fault model memory. In particular, the system generates an XML-based fault model for analysis of fault causes in fault events of industrial process plants.

The invention, accordingly, relates to procedures and measures with which models initially compiled as a Word document are transferred into XML implementations for the fault cause analysis. The structure of the respective Word document is, in this case, derived from a metamodel, designated a template here, for the fault cause analysis. This metamodel describes the procedure during the analysis, and also structures and contents of the necessary information needed for the analysis. The fact that this metamodel defines the structure of the Word document and, at the same time, the data structures of XML means that a very simple and efficient depiction rule has been found for transferring the Word document into an XML implementation.

A significant advantage of the invention is that the contents of the models for the fault cause analysis can be documented by specialist personnel from the respective application areas themselves. In this case, such an expert merely has to maintain a predefined structure of the document. The transfer of the models into a web environment, then, takes place automatically.

In accordance with another feature of the invention, there are provided a display device and a web browser, the second fault model memory storing an XML-based fault model, the data processing device having an XML engine connected to the schematic memory and to the second fault model memory for accessing the schematic memory and the second fault model memory, and the XML engine displaying the XML-based fault model stored in the second fault model memory in the display device through the web browser.

With the objects of the invention in view, there is also provided a method for generating an XML-based fault model for fault cause analysis, including the steps of providing a system having a data entry device and a data processing device having a word processor and a translator, supplying data through the data entry device to the word processor, compiling, from the data, a fault model as a Word document with the word processor, a structure of the Word document being predefined by a stored fault model template, storing the fault model Word document, accessing the fault model template and the fault model Word document with a translator and transferring, with the translator, formats of the fault model template into XML types and storing the formats in an XML fault model schematic and translating, with the translator, the fault model Word document into XML instances built up on the XML types of the XML fault model schematic and storing the XML instances as an XML fault model. In particular, the method generates an XML-based fault model for analysis of fault causes in fault events of industrial production plants.

In accordance with a concomitant mode of the invention, there is provided the step of displaying the XML fault model at a display device through an XML engine of the data processing device and through a web browser.

Other features that are considered as characteristic for the invention are set forth in the appended claims.

Although the invention is illustrated and described herein as embodied in a system and method for generating an XML-based fault model, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
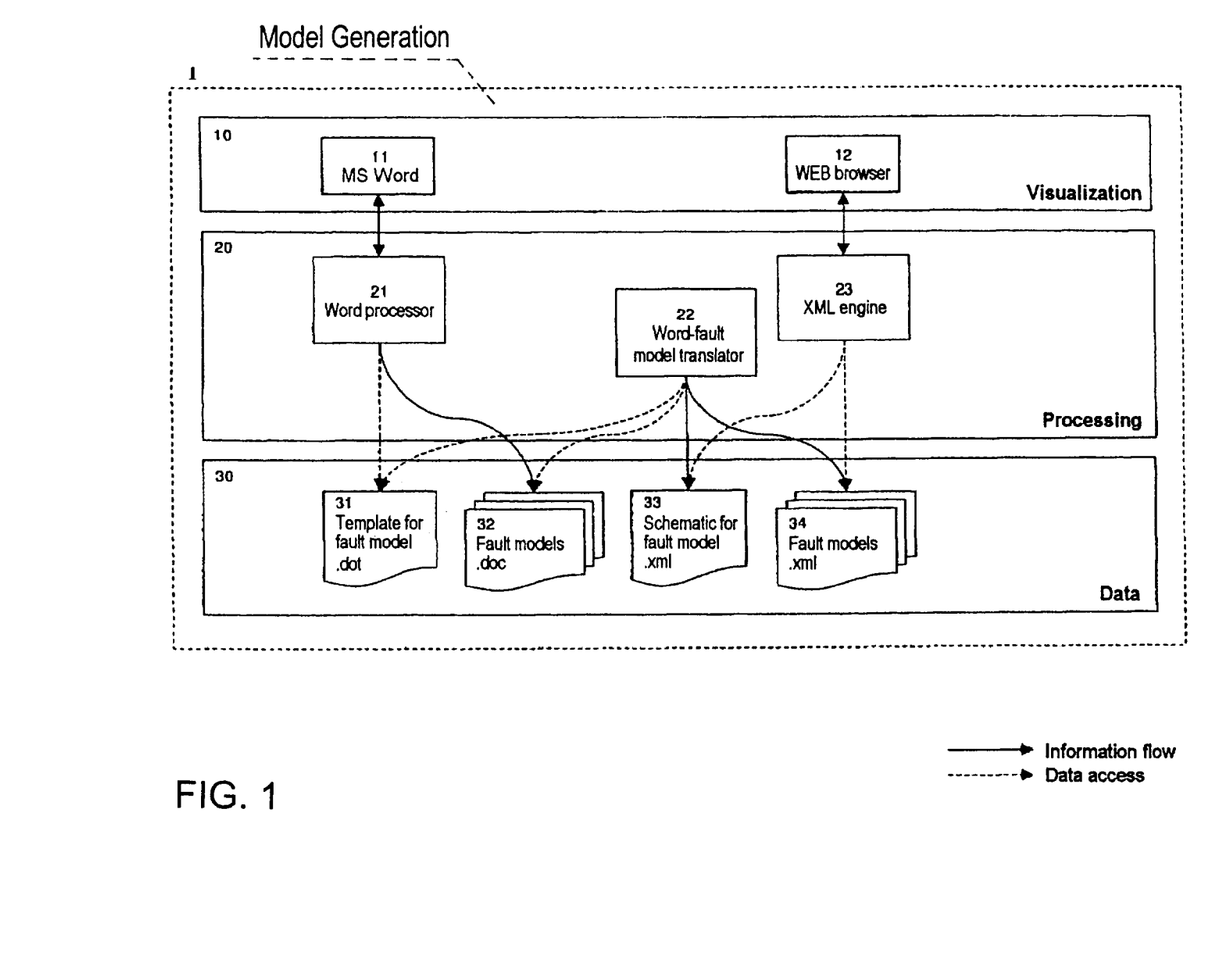
FIG. 1 is a block circuit diagram of a system according to the invention for generating an XML-based fault model.

Referring now to the figures of the drawings in detail and first, particularly to FIG. 1 thereof, there is shown a block schematic drawing of a system 1 for generating XML-based models for fault cause analysis. The system is divided into a data input and visualization device or means 10, a data processing device 20, and data memory 30. A data input device 11 and a word processor 21, which has access to a template memory 31, are set up to compile at least one fault model as a Word document and store it in a first fault model memory 32. The data input device 11 and the word processor 21 for text processing are standard components. The data processing device 20 contains a Word-fault model translator 22, which has access both to a metamodel or template stored in the template memory 31 and to the one fault model or plurality of fault models in the first fault model memory 32. The translator 22 is connected to a schematic memory 33 for the storage of XML types, and to a second fault model memory 34 for the storage of XML instances. An XML engine 23, a standard component, is present for the preparation and syntactical checking of data from the memories 33 and 34, and for the display of XML-based fault models by a web browser in a display device 12.

Figure 2:
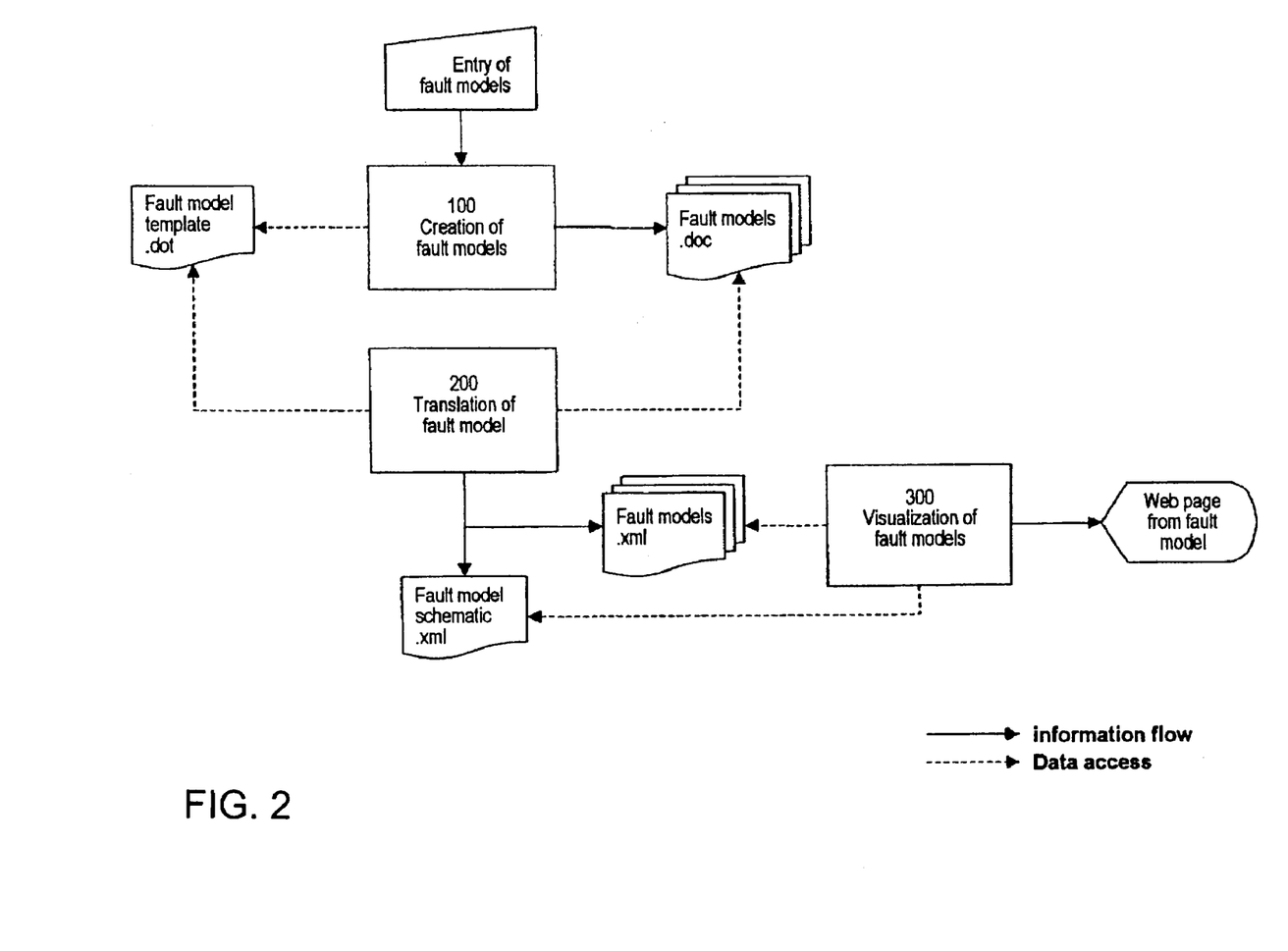
FIG. 2 is a flow chart illustrating an exemplary embodiment of the way in which the system of FIG. 1 works.

FIG. 2 shows the method for generating XML-based models for fault cause analysis.

Figure 3:
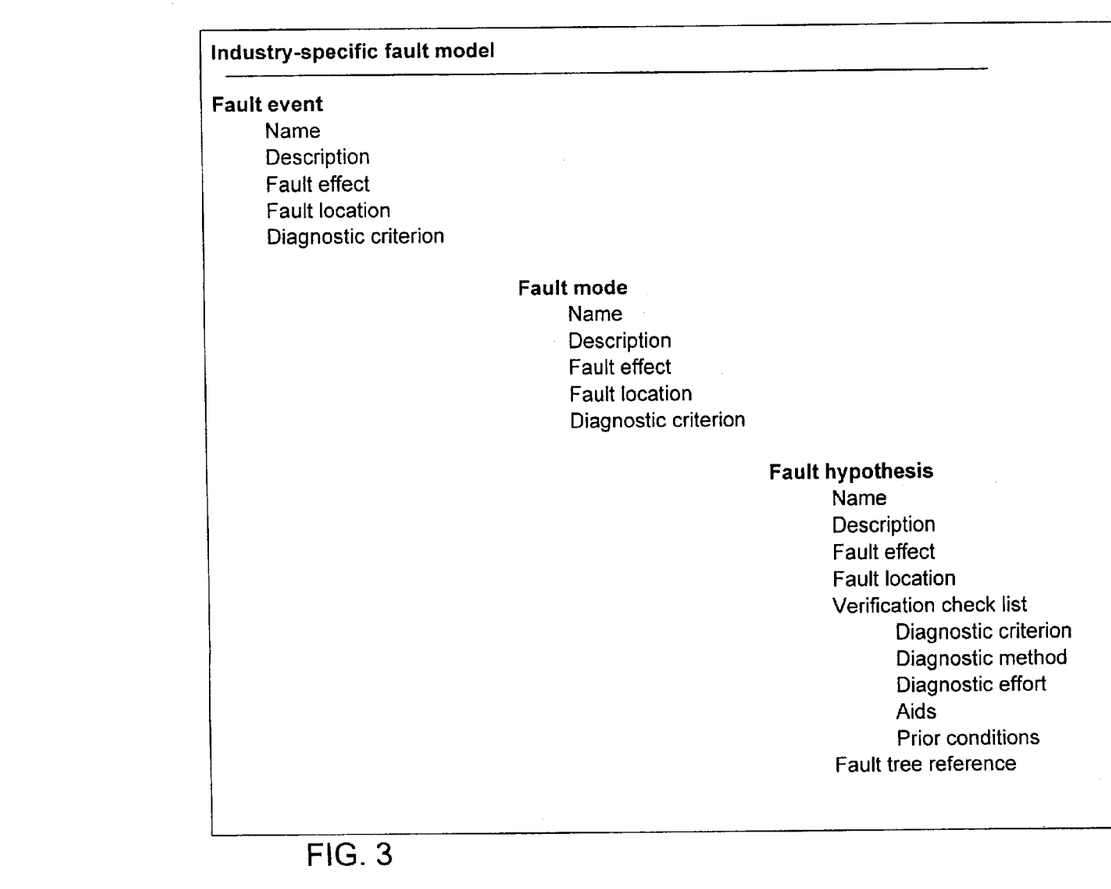
FIG. 3 is a textual listing of a structure of a fault model according to the invention.

In a step 100, the fault model is created with MS Word. A template from the template memory 31 predefines the structure of the Word document. The formats of the template are derived from the structure of an industry-specific fault model. The structure of such a fault model is shown by FIG. 3, and the formats derived therefrom by FIG. 4. The fault model created with the template is stored as a Word document in the first fault model memory 32. FIG. 5 shows an extract from such a fault model created in Word.

Figure 6:
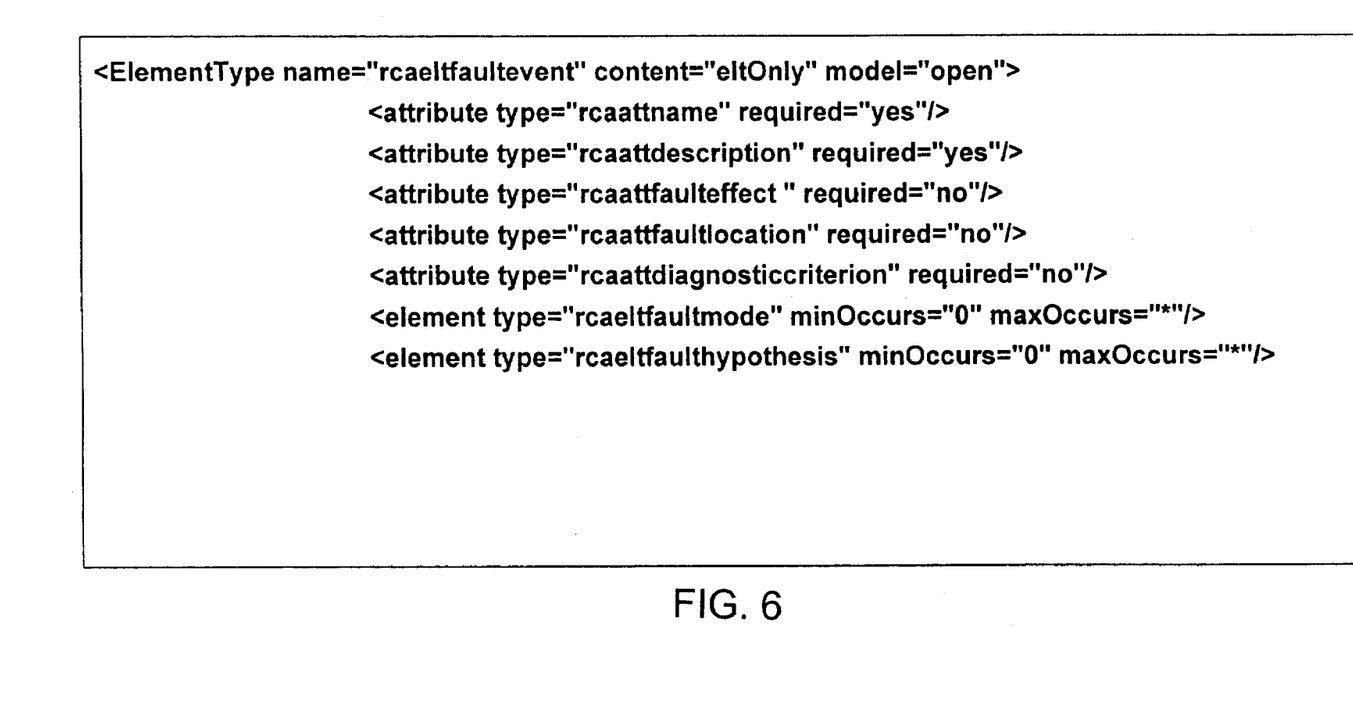
FIG. 6 is a textual listing of an XML-based type system for a fault event according to the invention.
Figure 7:
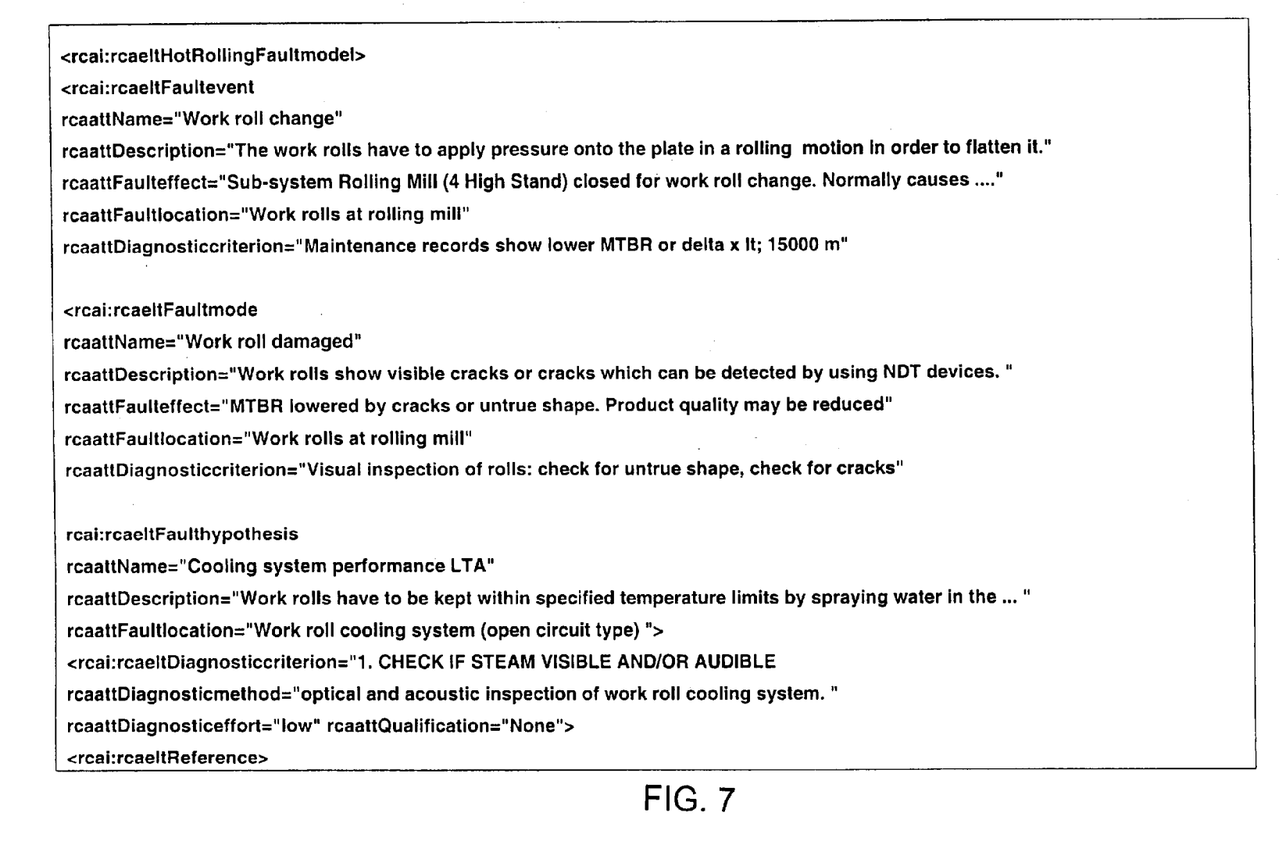
FIG. 7 is a textual listing of an instance of a fault model according to the invention in XML.

In a step 200, the translator 22 translates the Word files into XML files:

a) the formats of the template are transferred in XML types and stored in an XML schematic in the schematic memory 33. FIG. 6 shows a type system generated in this way for the part of the fault model that represents a fault event, as explained further below. The XML schematic, therefore, defines an application-specific type system; and b) in addition, the translator 22 translates the fault models stored in the first fault model memory 32 into XML instances, which are stored in the second fault model memory 34. These instances are based on the type system defined in the XML schematic. FIG. 7 shows an example of a fault model translated into XML in this way.

The method for generating an XML-based fault model is intrinsically concluded by the storage of the XML fault model ready to be called up. However, in an additional step 300, by the XML engine 23, and as a result of access to the schematic stored in the schematic memory 33 and to the second fault model memory 34, the respective XML-based fault model can be displayed in the display device 12 by a web browser. By using the XML schematic, the XML engine 23 checks the syntactical correctness of the XML implementation as it builds up the web pages.

FIG. 3 shows the structure of a fault model using the example of an industry-specific fault model. The model has a hierarchical structure, including three levels. The top level represents the fault event. A fault event can have a plurality of fault modes placed beneath it. The logical relationship can be formulated as set forth in the following text.

One or more fault modes can cause a fault event. The same logical relationship applies to fault modes and fault hypothesis: one or more fault hypotheses can be the fault cause for a fault mode. The concepts of fault event, fault mode, and fault hypothesis of the three levels have a similar description in terms of content. The fault hypothesis is distinguished by a more complicated diagnostic concept. In addition, the fault hypothesis can refer to other fault models for the purpose of more in-depth analysis.

Figure 4:
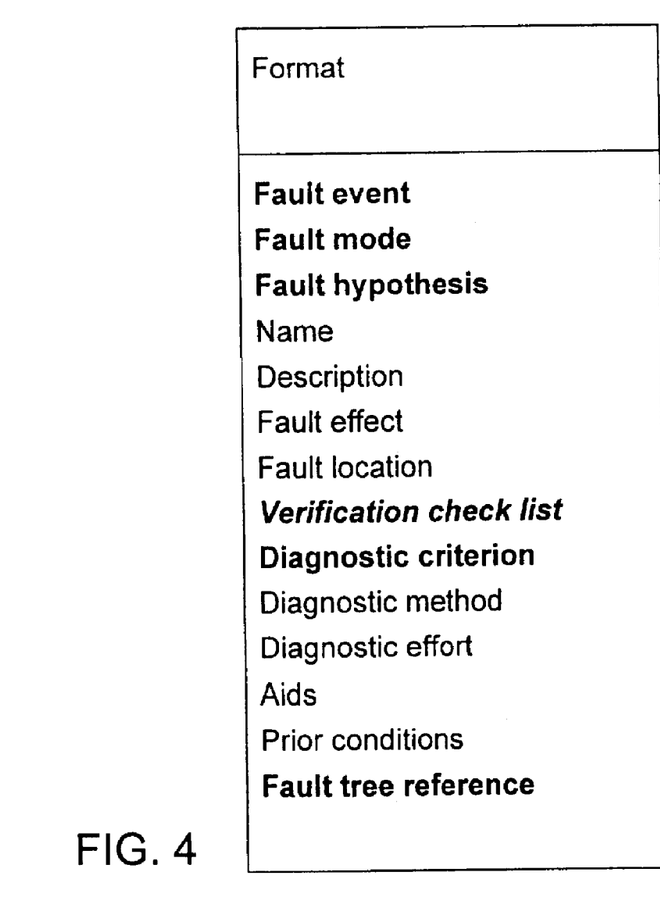
FIG. 4 is a textual listing of formats for the compilation of an exemplary embodiment of a fault model according to the invention.
Figure 5:
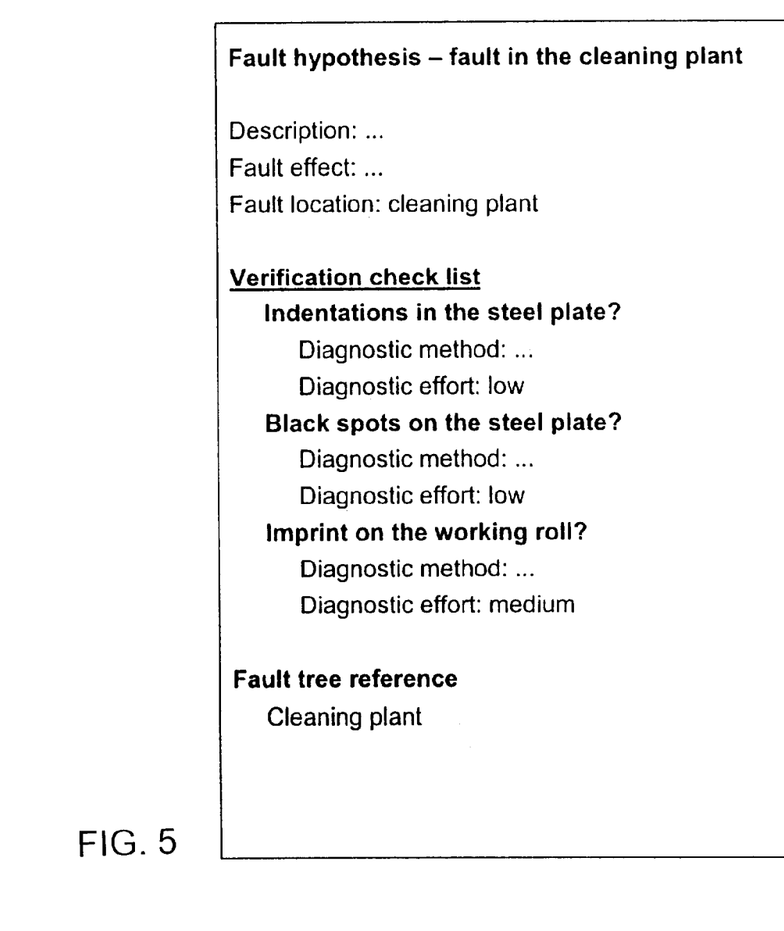
FIG. 5 is a partial textual listing of a fault model according to the invention.

FIG. 4 shows formats with the aid of which the fault models can be built up in a structured manner in the Word document. The formats result from the concepts of the fault model that is shown in FIG. 3.

FIG. 5 shows, by way of example, a fault model that was developed based upon the template with the aid of the formats defined therein. FIG. 4 describes the formats in more detail.

FIG. 6 shows the XML-based type system for the fault event. This type system is drawn up with the aid of a depiction rule from the format description of the template. The depiction rules are given by the structure of the fault model and the syntax of the XML language.

FIG. 7 shows, by way of example, the instance of a fault model in XML. The translator 22 generates this instance automatically from the Word document compiled. The application-specific types are described in the schematic file, see FIG. 6 for this. All the types begin with the prefix rca, followed by att for attribute or elt for element. This is followed by a brief description of the application-specific context, such as 'fault location.' The components of the contents are in inverted commas, in accordance with the XML syntax.

We claim:

1. A system for generating an XML-based fault model for fault cause analysis, comprising:
    a template memory for storing templates;
    a first fault model memory;
    a schematic memory for storing XML types;
    a second fault model memory for storing XML instances;
    a data processing device having a word processor and a translator, said data processing device:
        connected to said template memory for accessing said template memory; and
        connected to said first fault model memory;
    a data entry device connected to said word processor, said data entry device passing data for compiling a fault model as a Word document at least through said data processing device, said word processor, and said first fault model memory, said Word document being stored in said first fault model memory; and
    said translator:
        connected to said first fault model memory for accessing said first fault model memory;
        connected to said schematic memory, said translator programmed to produce said XML types in said schematic memory by transferring a template stored in said template memory into said XML types; and
        connected to said second fault model memory, said translator programmed to produce said XML instances by translating said Word document stored in said first fault model memory.

2. The system according to claim 1, including a display device and a web browser, said second fault model memory storing an XML-based fault model, said data processing device having an XML engine connected to said schematic memory and to said second fault model memory for accessing said schematic memory and said second fault model memory, and said XML engine displaying said XML-based fault model stored in said second fault model memory in said display device through said web browser.

3. A system for generating an XML-based fault model for analysis of fault causes in fault events of industrial process plants, comprising:
    a template memory for storing templates;
    a first fault model memory;
    a schematic memory for storing XML types;
    a second fault model memory for storing XML instances;
    a data processing device having a word processor and a translator, said data processing device:
        connected to said template memory for accessing said template memory; and
        connected to said first fault model memory;
    a data entry device connected to said word processor, said data entry device passing data for compiling a fault model as a Word document at least through said data processing device, said word processor, and said first fault model memory, said Word document being stored in said first fault model memory; and
    said translator:
        connected to said first fault model memory for accessing said first fault model memory;
        connected to said schematic memory, said translator programmed to produce said XML types in said schematic memory by transferring a template stored in said template memory into said XML types; and
        connected to said second fault model memory, said translator programmed to produce said XML instances by translating said Word document stored in said first fault model memory.

4. The system according to claim 3, including a display device and a web browser, said second fault model memory storing an XML-based fault model, said data processing device having an XML engine connected to said schematic memory and to said second fault model memory for accessing said schematic memory and said second fault model memory, and said XML engine displaying said XML-based fault model stored in said second fault model memory in said display device through said web browser.

5. A method for generating an XML-based fault model for fault cause analysis, which comprises:
    providing a system having a data entry device and a data processing device having a word processor and a translator;
    supplying data through the data entry device to the word processor;
    compiling, from the data, a fault model as a Word document with the word processor, a structure of the Word document being predefined by a stored fault model template;
    storing the fault model Word document;
    accessing the fault model template and the fault model Word document with a translator and:
        transferring, with the translator, formats of the fault model template into XML types and storing the formats in an XML fault model schematic; and
        translating, with the translator, the fault model Word document into XML instances built up on the XML types of the XML fault model schematic and storing the XML instances as an XML fault model.

6. The method according to claim 5, which further comprises displaying the XML fault model at a display device through an XML engine of the data processing device and through a web browser.

7. A method for generating an XML-based fault model for analysis of fault causes in fault events of industrial production plants, which comprises:

providing a system having a data entry device and a data processing device having a word processor and a translator;

supplying data through the data entry device to the word processor;

compiling, from the data, a fault model as a Word document with the word processor, a structure of the Word document being predefined by a stored fault model template;

storing the fault model Word document;

accessing the fault model template and the fault model Word document with a translator and:

transferring, with the translator, formats of the fault model template into XML types and storing the formats in an XML fault model schematic; and translating, with the translator, the fault model Word document into XML instances built up on the XML types of the XML fault model schematic and storing the XML instances as an XML fault model.

8. The method according to claim 7, which further comprises displaying the XML fault model at a display device through an XML engine of the data processing device and through a web browser.

* * * * *